United States Patent [19]

Hwang

[11] Patent Number: 4,976,342
[45] Date of Patent: Dec. 11, 1990

[54] CLEANING DEVICE FOR ARMREST BELT OF THE ESCALATOR

[76] Inventor: Feng-Lin Hwang, No. 21, Pa Te Road, Chi Tu District, Keelung City, Taiwan

[21] Appl. No.: 443,735

[22] Filed: Nov. 30, 1989

[51] Int. Cl.⁵ .......................................... B65G 45/00
[52] U.S. Cl. .................................................. 198/495
[58] Field of Search ............... 198/495, 494; 15/256.5, 15/256.51, 256.6

[56] References Cited

U.S. PATENT DOCUMENTS

| | | | |
|---|---|---|---|
| 3,910,400 | 10/1975 | Hishitani | 198/494 X |
| 3,941,241 | 3/1976 | Hishitani | 198/494 |
| 3,946,853 | 3/1976 | Ishida | 198/494 |
| 4,934,512 | 6/1990 | Lin et al. | 198/495 |

FOREIGN PATENT DOCUMENTS

| | | | |
|---|---|---|---|
| 0266627 | 5/1988 | European Pat. Off. | 198/495 |
| 2257841 | 5/1974 | Fed. Rep. of Germany | 198/495 |
| 2505874 | 8/1976 | Fed. Rep. of Germany | 198/495 |
| 0235118 | 10/1987 | Japan | 198/495 |
| 0914432 | 3/1982 | U.S.S.R. | 198/495 |

*Primary Examiner*—Joseph E. Valenza
*Assistant Examiner*—D. Glenn Dayoan
*Attorney, Agent, or Firm*—Ostrolenk, Faber, Gerb & Soffen

[57] ABSTRACT

A device for cleaning an armrest belt of an escalator without interfering with the normal operation of the escalator. The device includes a container and a roller. The roller is in contact with the surface of the armrest belt such that movement of the armrest belt causes the roller to rotate. The roller is formed of an absorbent material so as to absorb cleaning liquid from the container and so as to apply cleaning liquid to the surface of the armrest belt when rotated by the armrest belt. The device further includes structure for cleaning liquid from the armrest belt.

9 Claims, 4 Drawing Sheets

CLEANING DEVICE FOR ARMREST BELT OF THE ESCALATOR

BACKGROUND OF THE INVENTION

1. Field of the Invention

The present invention relates to a cleaning device for an armrest belt of an escalator. In particular, the invention relates to a cleaning device which is installed on the floor near an outlet where the armrest belt rises upwardly. Advantageously, the armrest belt can be cleaned while it is being used.

2. Description of the Related Art

A conventional cleaning device for cleaning an armrest belt B is shown in FIG. 4. The device includes an applying means C which applies cleaning liquid to the surface of the armrest belt B, a scraper D which scrapes off excess liquid from the belt B, containers E which contain cleaning liquid, and wiping means F which wipes the surface of the belt B. The conventional device cleans the belt B as the belt B moves along an armrail A. The applying means C comprises an intensive liquid-absorbing material G which is in close contact with the belt B and a container I which houses the liquid-absorbing material G. The container I has a supply hole H through which cleaning liquid is supplied. The applying means C further comprises a construction J which securely supports the container I on the armrail A. The bottom of the scraper D is curved so as to be in close contact with the top surface of the belt B. The scraper B has two lateral sides which extend downward into the containers E. The containers E are mounted to the lateral sides of the armrail A. The wiping means F is provided with a wiper K. A presser L is provided on the wiper K. The presser L adapts to the configuration of the armrest belt B to enable the wiper K to make close contact with the belt B. The applying means C, the scraper D, and the wiping means F are orderly spaced and are interconnected by a rope M.

In use, the device is mounted onto armrail A by means of the construction J. As the belt B moves, cleaning liquid infused in the container I passes through the supply hole H into the material G which effectively applies the liquid to the surface of the belt B. Any excessive liquid is scraped by the scraper D and streams into the container E, and the wiper K wipes the passing surface of the belt B clean. The device relies on gravity and therefore must be mounted above the belt B. Thus, during cleaning, use of the escalator has to be stopped. This makes frequent cleaning of the belt B unlikely.

OBJECT OF THE INVENTION

The major object of the invention is to solve the above-described deficiency by providing an improved cleaning device. The improved device is positioned in the upper section of a container that contains a mixture of cleansing and sterilizing liquids and is installed at an outlet form which the armrest belt rises upwardly during use. Thus, during cleaning, the escalator can be used, and frequent cleaning and sterilizing of the armrest belt is possible.

SUMMARY OF THE INVENTION

The present invention relates to a device for cleaning an armrest belt of an escalator. The device comprises an applying means which applies a mixture of cleansing and sterilizing liquids to a belt, a wiping means which scrapes and wipes the mixture from the surface of the belt, and a container which contains the applying means, the wiping means, and the mixture. The device is installed in the vicinity of the floor, where the armrest belt rises up in use. Thus, the belt can be frequently cleaned, during use of the escalator.

DETAILED DESCRIPTION OF THE PREFERRED EMBODIMENT

Figure 1:
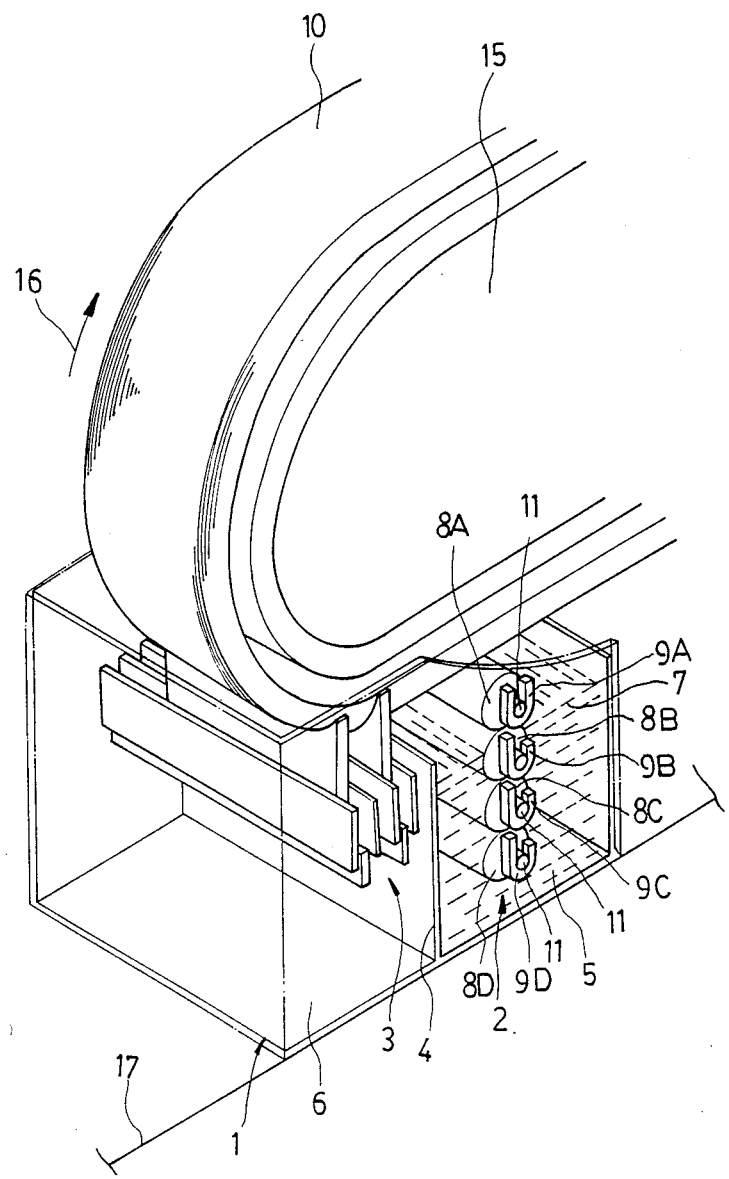
FIG. 1 is a perspective view of a cleaning device in accordance with the invention.
Figure 2:
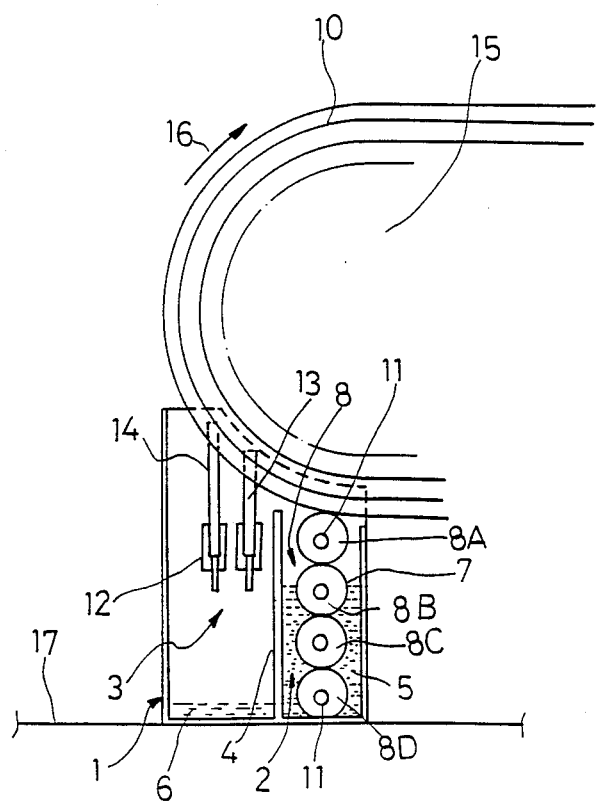
FIG. 2 is a sectional side view of FIG. 1.

As illustrated in FIGS. 1 and 2, a device in accordance with the invention comprises: a container 1, applying means 2 and wiping means 3. The container 1 is bottom-sealed and is divided by a partition board 4 into a front area 5 and a rear area 6. An appropriate amount of a mixture of cleansing and sterilizing liquids 7 is contained in the front area 5. The applying means 2 is mounted between the lateral sides of the front area 5. The applying means 2 includes one or more rollers which are arranged in parallel rows with their outer surfaces touching each other. In the preferred embodiment, there are four rollers 8A, 8B, 8C, 8D. Ends of the rollers 8A-8D are hung on shaft supports 9A, 9B, 9C, 9D which are provided on the lateral sides of the front area 5. The movement of one roller will cause the other three rollers to rotate. The lowest roller 8D, whose top surface contacts the bottom surface of mid roller 8C, is very near the bottom of the front area 5. There is only a small gap between the bottom of the roller 8D and the bottom of the front area 5. Thus, even when the mixture 7 contained in front area 5 is almost used up, it can still be brought by way of the lowest roller 8D through the mid rollers 8C, 8B to the top roller 8A to be applied onto the surface of the armrest belt 10. The surface of the top roller 8A contacts the surface of the belt 10. Thus, when the belt 10 moves, the top roller 8A is rotated by friction therebetween and the mixture 7 absorbed within the rollers is applied to the belt 10. It can be seen that the top roller 8A drives the mid rollers 8B, 8C and the lowest roller 8D so as to provide an endless supply of mixture 7 to the top roller 8A for application. The rollers 8A, 8B, 8C, 8D are cylindrical and are made up of multi-poriferous and moderately resilient material and thus have intensive liquid-absorbing ability. The center shafts 11 of the rollers 8A-8D are made of hard material.

The wiping means 3 is located in the rear area of the container 1. The wiping means 3 comprises members 12, scraping plate 13 and wiping plate 14. The members 12 consist of slices. The scraping plate 13 and the wiping plate 14 are laid between the slices. The members 12 extend between lateral sides of the rear area 6 at an appropriate height. The scraping plate 13 and the wiping plate 14 are both made up of multi-poriferous, moderately resilient material and thus have intensive liquid-absorbing ability. The top parts of the plates 13, 14 are shaped like an arc to adapt to and to closely contact the surface of the armrest belt 10. Thus, as the armrest belt 10 moves, the scraping plate 13 scrapes the mixture 7 from the armrest belt 10. The scraped mixture then drops into and is contained within the rear area 6 of the container 1. The wiping plate 14 then wipes the armrest belt 10 clean.

Figure 3A:
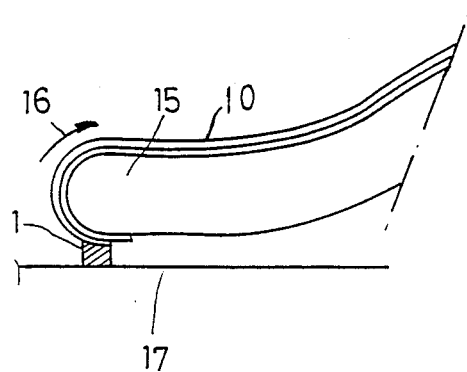
FIGS. 3a and 3b are schematic views of the device in use.
Figure 3B:
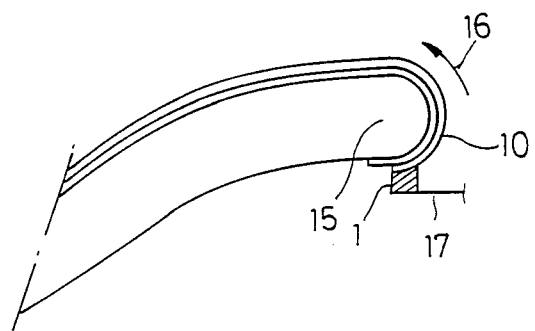
Figure 4:
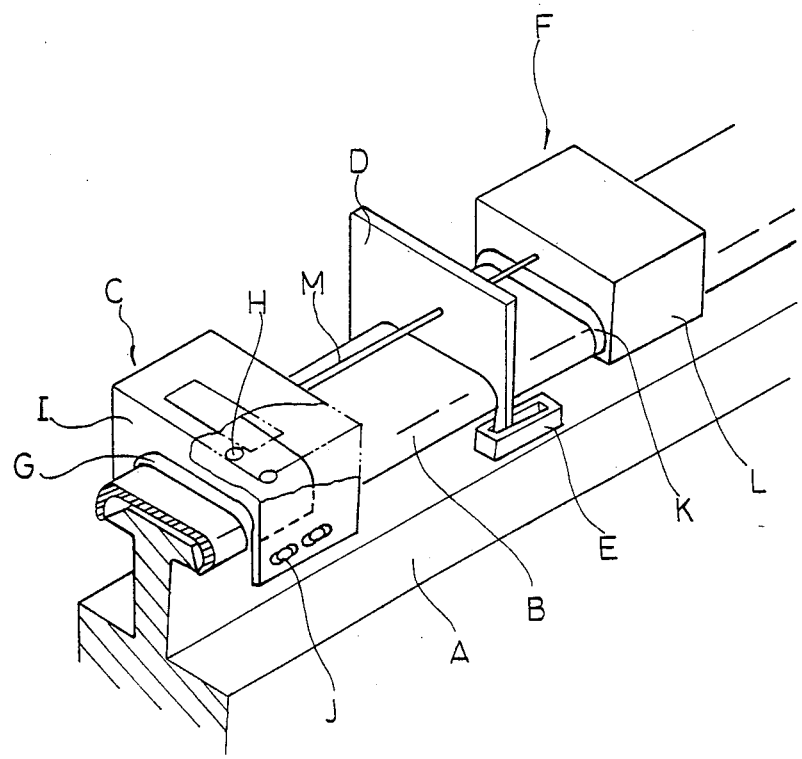
FIG. 4 is a perspective view of a conventional device.

FIG. 3a shows an armrail 15 of a rising escalator. Its armrest belt 10 moves in the direction of an arrow 16. The container 1 is installed on the downstairs floor 17 in the vicinity of an opening through which the armrest belt 10 rises upwardly. FIG. 3b is indentical to FIG. 3a except that FIG. 3b illustrates a descending escalator. The armrest belt 10 of the descending escalator moves in the direction of the arrow 16, and the container 1 is installed on the upstairs floor 17 in the vicinity of an opening through which the armrest belt 10 rises upwardly.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A device for cleaning an armrest belt of an escalator without interfering with the normal operation of the escalator, the device comprising:
   a container which includes a front area, a rear area and a partition for separating the front area and the rear area;
   a roller which is in contact with the surface of the armrest belt such that movement of the armrest belt causes the roller to rotate, the roller being formed of an absorbent material so as to absorb cleaning liquid from the front area of the container and so as to apply cleaning liquid to the surface of the armrest belt when rotated by the armrest belt; and
   means for removing cleaning liquid from the armrest belt, the removing means being associated with the rear area of the container.

2. A device for cleaning an armrest belt of an escalator without interfering with the normal operation of the escalator, the device being operatively positionable on the floor in the vicinity of an opening for the armrest belt, the device comprising:
   a container;
   a roller system which includes an uppermost roller and a lowermost roller, the uppermost roller being in contact with the surface of the armrest belt such that movement of the armrest belt causes the uppermost roller to rotate, the lowermost roller being located near the bottom of the container, the roller system being arranged such that rotation of the uppermost roller causes the lowermost roller to rotate, the rollers being formed of an absorbent, moderately resilient material so as to absorb cleaning liquid from the container and so as to apply cleaning liquid to the surface of the armrest belt when rotated by the armrest belt; and
   means for removing cleaning liquid from the armrest belt.

3. The device of claim 2, wherein the container includes a sealed bottom, a front area, a rear area and a partition for preventing communication between the front area and the rear area, the roller system being located within the front area, the removing means being installed in the rear area.

4. The device of claim 3, wherein the partition includes a partition board.

5. The device of claim 3, wherein the front area of the container includes lateral sides, the container including supports which are located on the lateral sides of the front area of the container, the rollers including shafts which are made of hard material, the shafts being hung on the supports.

6. The device of claim 4, wherein the roller system includes a first mid roller and a second mid roller, the first mid roller being in contact with the uppermost roller, the second mid roller being in contact with the first mid roller and the lowermost roller being in contact with the second mid roller such that movement of the armrest belt causes the uppermost roller, the mid rollers and the lowermost roller to rotate simultaneously.

7. The device of claim 6, wherein the removing means includes a scraping plate for scraping cleaning liquid from the armrest belt and a wiping plate for wiping cleaning liquid from the armrest belt, said plates being formed of moderately resilient, absorbent material.

8. The device of claim 7, wherein said plates have curved tops so as to closely contact the surface of the armrest belt.

9. The device of claim 8, wherein the rear area of said container has lateral sides, said container including multi-piece support members which are secured to the lateral sides of the rear area of the container, the plates being supported within the support members.

* * * * *